May 31, 1938. H. L. MYERS 2,119,343
DISPLAY DEVICE
Filed June 10, 1936 2 Sheets-Sheet 1

INVENTOR.
HAROLD L. MYERS
BY
ATTORNEYS.

May 31, 1938.  H. L. MYERS  2,119,343
DISPLAY DEVICE
Filed June 10, 1936   2 Sheets-Sheet 2
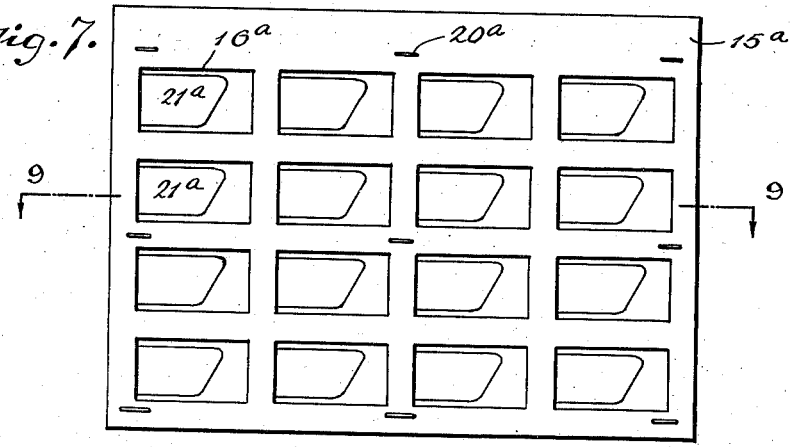
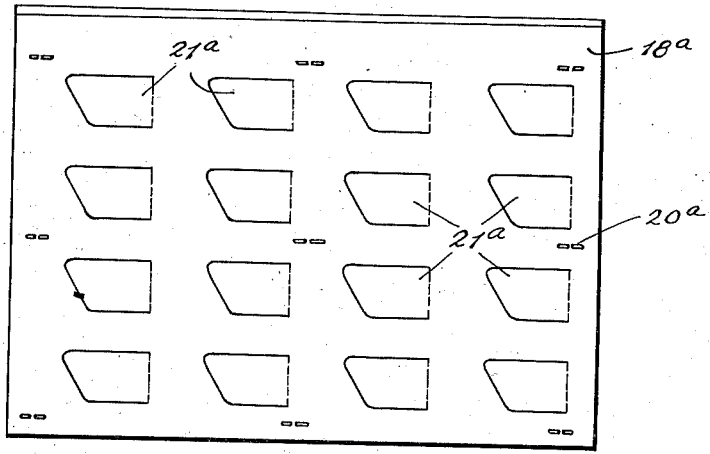
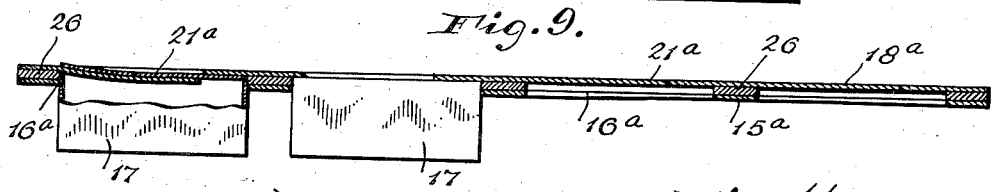
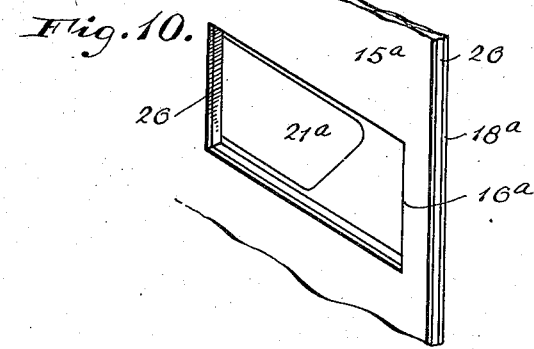
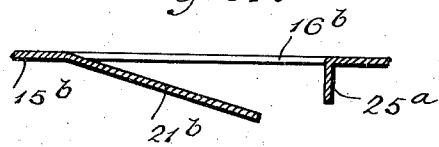
INVENTOR.
HAROLD L. MYERS
BY
ATTORNEYS Patented May 31, 1938

2,119,343

UNITED STATES PATENT OFFICE 2,119,343

DISPLAY DEVICE

Harold L. Myers, Morristown, N. J.

Application June 10, 1936, Serial No. 84,433

6 Claims. (Cl. 206—80)

My invention relates to display devices and more particularly to display devices for displaying packages of merchandise as exemplified for instance by the conventional packages in which safety razor blades are sold.

The invention has for its object the provision of a display device of the indicated class whereby one or more of the packages of merchandise are supported in attractive display positions for purposes of advertisement and sale. The invention contemplates particularly the provision of a display device constructed in a manner to efficiently prevent unintentional shifting of the packages of merchandise during shipment, storage and the like, while at the same time permitting the packages to be easily placed in display position on the device and readily removed therefrom as may be required.

Other more specific objects will appear from the description hereinafter and the features of novelty will be pointed out in the claims.

Figure 1:
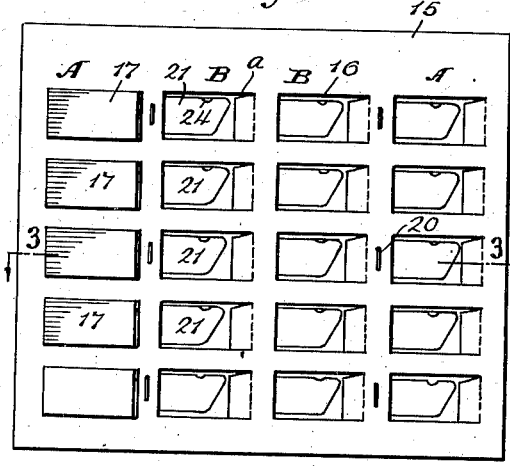
Figure 2:
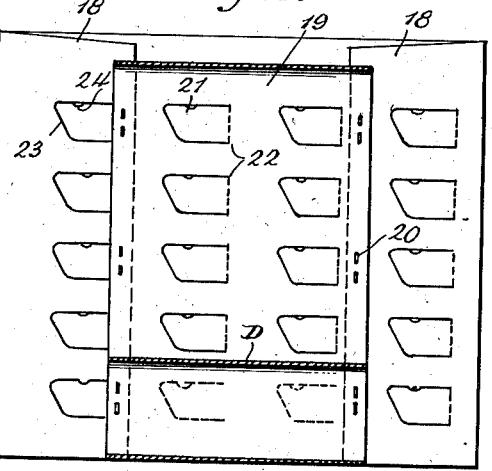
Figure 3:
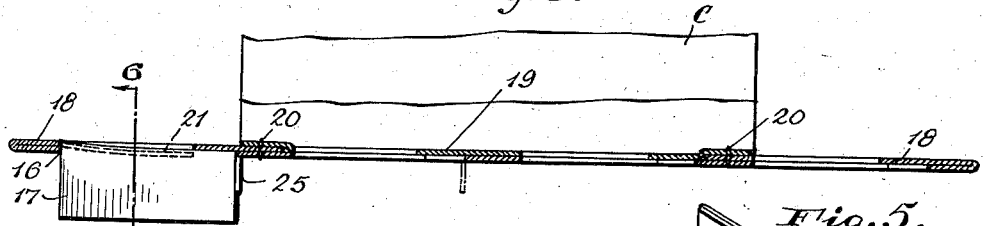
Figure 4:
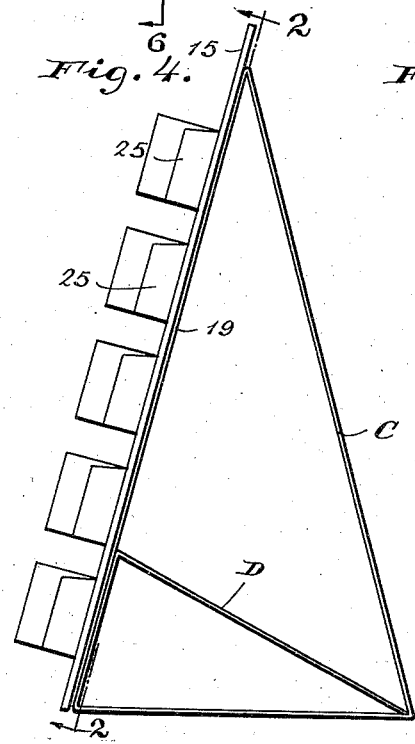
Figure 6:
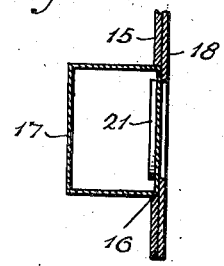
Figure 5:
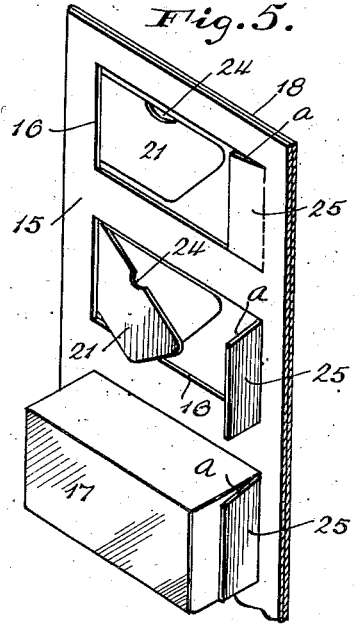

In the accompanying drawings which illustrate several examples of the invention without defining its limits, Fig. 1 is a face view of the novel display device in one form; Fig. 2 is a rear view thereof partly in section on the line 2—2 of Fig. 4; Fig. 3 is a horizontal section on a somewhat larger scale taken on the line 3—3 of Fig. 1; Fig. 4 is a side elevation of the display device; Fig. 5 is a fragmentary perspective view thereof; Fig. 6 is a detailed section on the line 6—6 of Fig. 3; Fig. 7 is a face view of another form of the display device; Fig. 8 is a rear view thereof; Fig. 9 is a horizontal section on an enlarged scale taken on the line 9—9 of Fig. 7; Fig. 10 is a fragmentary perspective view of the form of the invention last referred to, and Fig. 11 is a fragmentary sectional view showing another form of the device.

The device as shown in Figs. 1 to 6 inclusive comprises a support which may be in the nature of a sheet 15 of cardboard or other suitable material and provided with at least one recess 16 dimensioned and shaped to receive a predetermined package 17 as will be more fully set forth hereinafter. In the illustrated example, the support 15 which constitutes a face member is provided with a plurality of recesses arranged in side groups A adjacent the opposite longitudinal edges of the support or face member 15 and with additional groups B of recesses 16 intermediate of or between the side groups A of recesses 16 as clearly shown in Fig. 1. The recesses 16 are provided with bottoms which, as shown in Figs. 2, 3, and 5, may be formed by backing means secured rearwardly of the face member 15 in fixed association therewith, said backing means, in the form shown, consisting of side members 18 arranged to provide bottoms for the recesses 16 of the groups A and by a supporting device 19 similarly providing bottoms for the recesses 16 of the intermediate groups B. In the example being described, the side members 18 consist of opposite edge portions of the face member 15 folded rearwardly into surface engagement with the rear face thereof and secured thereto in any suitable manner as for instance by metallic staples 20. The supporting device 19 is secured rearwardly of the face member 15 and as shown, may span the space between the opposite side members 18 in parallel surface relation to the rear surface of the face member 15 and be fastened in place, for instance, by means of the same metallic staples 20 which fasten the side members 18 in position. The supporting device 19 may be of any suitable type adapted to support the display device in a predetermined display position and as shown in Fig. 4 may consist of a collapsible easel C fixed in operative position by a brace D forming a foldable part of the supporting device 19 as shown in Fig. 4. With this arrangement, the recesses 16 are all provided with bottoms, the latter in turn including tongues 21 which normally lie in the plane of the bottoms of said recesses and accordingly are normally located in a plane to the rear of the support or face member 15. The tongues 21 preferably comprise integral parts of the side member 18 and supporting device 19 and may be cut therefrom in such a manner as to remain in hinged connection with said side members 18 and supporting device 19 at one end as indicated at 22 in Fig. 2. The free ends of the tongues are preferably tapered, for instance as indicated at 23 and may be provided with notches 24 to facilitate the adjustment of said tongues 21 to a position for insertion into the packages 17 as will be described more fully later on. As shown, the tongues 21 are located in registry with the respective recesses 16, the hinged end of each tongue preferably being located in substantial registry with the one end of the recess 16 with which the particular tongue 21 is in registry. In length the tongues 21 are somewhat shorter than the recesses 16 as illustrated for instance in Fig. 5.

The packages 17 for which the novel display devices are especially designed are generally in the form of containers or cartons which include end flaps adapted to be tucked into the ends of said containers to close the same. With this arrangement, the packages 17 are open at the opposite ends in the form of narrow slits as represented by the spaces between the aforesaid end flaps and the adjacent portions of the packages 17. When it is desired to place such a package 17 in position on the display device, the particular tongue 21 is flexed out of the plane of the bottom of said recesses, for instance to the angular position illustrated in Fig. 5, after which the tapered end 23 of said tongue is inserted into the aforesaid narrow slit at one end of the package 17 and the package is then adjusted lengthwise of said tongue 21 toward the hinged end thereof; in this position the package 17 will register with the particular recess 16 and may accordingly be fully inserted into the same as shown at the bottom of Fig. 5, the flexibility of the tongue 21 permitting this insertion without interference. At this stage the package 17 occupies the position illustrated in Figs. 3 and 5 in which position opposite ends of said package 17 are preferably in engagement with the opposite ends of the particular recess 16 in which said package is located. The particular tongue 21 accordingly will removably fix said package in its recess and the engagement of said package with the opposite ends of the particular recess 16 may be relied upon to prevent material movement lengthwise of the tongue 21 in the direction of removal therefrom.

If desired, however, additional protection against such unintentional removal of the package 17 from its tongue 21 may be provided in the form of means adjustable into substantially perpendicular relation to the recess 16 to constitute a stop whereby the above mentioned unintentional separation of the package from the tongue is further prevented. As illustrated in the form shown in Figs. 1 to 6 inclusive, this means may comprise flaps 25 hinged to a suitable part of the device as for instance by being foldably connected with the support or face member 15 at one end of each recess 16 as shown in Figs. 1 and 5; in such case, the flaps 25 are preferably cut from the face member 15 and are adjustable into substantially perpendicular relation to the recesses 16 so as to lie in engagement with one end of a particular package 17 as illustrated in Figs. 3 to 5. To facilitate the adjustment thereof to operative positions, the flaps 25 may be cut away or bevelled at one end as indicated at a.

In the form shown in Figs. 7 to 10 inclusive, the device comprises a support or face member 15a corresponding to the previously mentioned face member 15 and likewise provided with one or more recesses 16a dimensioned and shaped to receive predetermined packages and to support the same in display positions. In this form also the recesses 16a are provided with bottoms formed by backing means illustrated in the form of a backing member 18a secured rearwardly of the face member 15a in rearwardly spaced relation thereto by means of spacing means as shown in Figs. 9 and 10; in the illustrated example the spacing means referred to consists of an intermediate member 26 provided with recesses in registry with the recesses 16a of the member 15a and located between the backing member 18a and the face member 15a as illustrated in Fig. 9. The face member 15a, the backing member 18a and the intermediate member 26 may be secured together in any suitable manner as by means of metallic staples 20a similar to the previously mentioned staples 20.

With the arrangement now being described, the backing member 18a forms bottoms for the recesses 16a which, because of the presence of the intermediate member 26, are of somewhat greater depth than the recesses 16 of the form of the device first described. As shown in Figs. 7 to 10 inclusive, the bottoms of the recesses 16a or more specifically the backing member 18a are provided with tongues 21a located in registry with the recesses 16a and corresponding to the tongues 21 referred to hereinbefore; the tongues 21a preferably comprise integral parts of the backing member 18a and normally lie in the plane thereof, said tongues 21a being in hinged connection with the backing member 18a and capable of being flexed out of said plane thereof for insertion into the packages 17 in the manner previously described. The form of the device now under discussion may include a supporting device of any suitable type as illustrated for instance by the foldable device 19 or, as shown in the drawings, may be constructed without such a device and maintained in display position in any convenient manner.

The packages 17 are combined with the respective tongues 21a in the same way as previously set forth herein and in their final position on said tongues are inserted into the respective recesses 16a as shown in Fig. 9. In this position the packages 17 are removably fixed in the recesses 16a and are held against accidental removal from said tongues by the end walls of said recesses 16a which, because of their relatively greater depth, efficiently prevent any material movement of the packages lengthwise of the tongues in the direction of removal therefrom. If desired or found necessary, additional means such as for instance the flaps 25 of the first form may be included in the device as shown in Figs. 7 to 10 inclusive although generally speaking this additional safeguard against unintentional dislocation of the packages 17 will not be necessary.

In the form shown more or less diagrammatically in Fig. 11, the device comprises a support 15b provided with recesses 16b for the reception of predetermined packages, the support 15b being of any suitable dimensions and shape and the recesses 16b likewise being dimensioned and shaped to receive the packages for which the device is designed. In this form tongues 21b corresponding to the previously mentioned tongues are cut directly in the support 15b so as to remain in hinged connection therewith at one end and normally lie in the plane of said support 15b in registry with the recesses 16b thereof.

These tongues 21b are combined with packages similar to the packages 17 in the manner previously set forth and serve to removably fix the packages in the recesses 16b. To prevent unintentional removal of the packages from the tongues 21b, this form of the device includes means adjustable to substantially perpendicular relation to the recesses 16b to constitute stops whereby movement of the packages lengthwise of the tongues 21b in the direction of removal therefrom is prevented. This means, as shown, may comprise flaps 25a cut from the support 15b so as to remain in hinged connection therewith at one end of each recess 16b as shown in Fig. 11. The flaps 25a are adjustable into substantially perpendicular relation to the recesses 16b as illustrated in Fig. 11 so as to lie in engagement with an end of the packages supported upon the tongues 21b in the manner described with respect to the flaps 25 in the first form of the device disclosed herein. It will be understood that the support 15b includes at least one recess 16b and its associated elements and preferably is provided with a plurality of such recesses 16b and associated elements as in the other illustrated forms of the novel display device.

In all of its forms the novel display device is adapted to efficiently support packages of the type in which safety razor blades are conventionally contained for sale in predetermined quantities, said packages being firmly yet removably fixed on the display device against any unintentional displacement thereon. The display devices with the packages for which they are designed in place thereon, accordingly serve to support said packages in attractive display positions and at the same time when loaded to capacity or otherwise may safely be stored and shipped without danger of accidental or unintentional displacement of the packages on the display device taking place during such storage and shipment. In addition, the display devices may be produced at low cost and require no particular skill in their use. Individual packages may be removed therefrom as required for instance for purposes of sale without effecting or disturbing any of the other packages on a given display device and without injury to the latter or to the package.

Various changes in the specific forms shown and described may be made within the scope of the claims without departing from the spirit of the invention.

I claim:

1. A display device comprising a face member provided with recesses dimensioned and shaped to receive predetermined packages, backing means secured rearwardly of said face member in fixed association therewith to provide bottoms for said recesses, and tongues forming integral parts of said backing means and normally lying in the plane thereof, said tongues being adapted to be inserted into said packages for removably fixing the latter in said recesses in engagement with the bottoms thereof.

2. A display device comprising a face member provided with recesses dimensioned and shaped to receive predetermined packages, a backing member secured rearwardly of said face member in fixed association therewith to provide bottoms for said recesses, tongues forming integral parts of said backing member and normally lying in the plane thereof, said tongues being adapted to be inserted into said packages for removably fixing the latter in said recesses in engagement with the bottoms thereof, and flaps hinged to one of said members and adjustable into substantially perpendicular relation to said recesses to constitute stops for preventing unintentional removal of said packages from said tongues.

3. A display device comprising a face member provided with recesses dimensioned and shaped to receive predetermined packages, a backing member secured rearwardly of said face member in fixed association therewith to provide bottoms for said recesses, tongues forming integral parts of said backing member and normally lying in the plane thereof, said tongues being adapted to be inserted into said packages for removably fixing the latter in said recesses in engagement with the bottoms thereof, and flaps hinged to said face member in registry with said recesses and adjustable into substantially perpendicular relation thereto to constitute stops for preventing unintentional removal of said packages from said tongues.

4. A display device comprising a face member provided with recesses dimensioned and shaped to receive predetermined packages, side members consisting of opposite edge portions of said face member folded rearwardly into surface engagement with the rear face of said face member and secured thereto to provide bottoms for said recesses, and tongues forming integral parts of said side members in registry with said recesses and adapted to be inserted into said packages for removably fixing the latter in said recesses.

5. A display device comprising a face member provided in its plane surface with side groups of recesses adjacent its opposite longitudinal edges and an intermediate group of recesses in said plane surface between said side groups, said recesses being dimensioned and shaped to receive predetermined packages, side members consisting of opposite edge portions of said face member folded rearwardly into surface engagement with the rear face of said face member and secured in fixed relation thereto to provide bottoms for said side groups of recesses, a supporting device secured rearwardly of said face member in registry with the intermediate group of recesses to provide bottoms therefor, and tongues forming integral parts of said side members and supporting device respectively and located in registry with the recesses of said respective groups, said tongues being adapted to be inserted into said packages for removably fixing the latter in said recesses in engagement with the bottoms thereof.

6. A display device comprising a face member provided in its plane surface with side groups of recesses adjacent its opposite longitudinal edges and an intermediate group of recesses in said plane surface between said side groups, said recesses being dimensioned and shaped to receive predetermined packages, side members consisting of opposite edge portions of said face member folded rearwardly into surface engagement with the rear face of said face member and secured in fixed relation thereto to provide bottoms for said side group of recesses, a supporting device secured rearwardly of said face member in registry with the intermediate group of recesses to provide bottoms therefor, tongues forming integral parts of said side members and supporting device respectively and located in registry with the recesses of said respective groups, said tongues being adapted to be inserted into said packages for removably fixing the latter in said recesses, and flaps hinged to said face member in registry with said recesses and adjustable into substantially perpendicular relation thereto to constitute stops for preventing unintentional removal of said packages from said tongues.

HAROLD L. MYERS.